US 6,561,650 B2

(12) United States Patent
Ito et al.

(10) Patent No.: US 6,561,650 B2
(45) Date of Patent: May 13, 2003

(54) POLARIZATION-CONVERTING UNIT AND PROJECTOR USING THE SAME

(75) Inventors: Shinsuke Ito, Shiojiri (JP); Takeshi Takizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/899,286

(22) Filed: Jul. 6, 2001

(65) Prior Publication Data

US 2002/0018183 A1 Feb. 14, 2002

(30) Foreign Application Priority Data

Jul. 7, 2000 (JP) ........................................ 2000-207073

(51) Int. Cl.⁷ .............................................. G03B 21/14
(52) U.S. Cl. .......................................... 353/20; 353/61
(58) Field of Search .............................. 353/20, 61, 8, 353/84, 119, 122

(56) References Cited

U.S. PATENT DOCUMENTS

| | | | |
|---|---|---|---|
| 6,254,238 B1 | * | 7/2001 | Takamatsu .................... 353/61 |
| 6,290,360 B1 | * | 9/2001 | Konuma et al. .............. 353/61 |
| 6,312,130 B2 | * | 11/2001 | Haba et al. .................... 353/20 |
| 6,398,366 B1 | * | 6/2002 | Hara et al. .................... 353/61 |

FOREIGN PATENT DOCUMENTS

| | | |
|---|---|---|
| JP | 8-304739 | 11/1996 |
| JP | 2000-081667 | 3/2000 |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

The invention provides a polarization-converting unit capable of being sufficiently cooled even when polarization-converting elements and a lens array are unitized together. Polarization-converting elements and a second lens array are held by a holding frame and a flow-inlet-side opening is arranged under the holding frame, and a flow-outlet-side opening is arranged over the holding frame so as to form a polarization-converting unit. Therefore, cooling air can be allowed to vertically flow through a clearance between the polarization-converting elements and the second lens array, thereby sufficiently cooling the polarization-converting elements and the second lens array from the faces thereof opposing each other. Therefore, in particular, the thermal effect to phase-difference plates pasted to the opposing faces of the polarization-converting elements can be reduced, and thereby the phase-difference plates are prevented from being peeled off so as to maintain the sufficient image quality.

13 Claims, 13 Drawing Sheets

POLARIZATION-CONVERTING UNIT AND PROJECTOR USING THE SAME

BACKGROUND OF THE INVENTION

1. Field of Invention

The present invention relates to a polarization-converting unit for converting luminous flux emitted from a light source into one kind of polarized light, and a projector for forming a projected image by modulating, magnifying and projecting the polarized light.

2. Description of Related Art

Recently, the number of environments in which projectors are used has increased, and apart from being used solely for presentations in office meetings or meetings on business trips, projectors are now being used at technical meetings in research and development divisions, etc., for capturing CAD/CAM/CAE data therein in order to magnify and project them, or at various seminars and learning courses. Projectors are also being used in school classes where audiovisual education is performed. Projectors are also used for studying therapeutic methods and for performing medical guidance by projecting medical images and data such as CT scans and MRI. Projectors are also being used for efficiently addressing people gathered at exhibitions or conventions.

Presently, because projectors are being used in various environments, the projectors are subject to various requirements relating to their specifications and functions, such as light-weight compact models pursuing portability, high-luminance and high-resolution models pursuing image quality, and value-added models capable of connecting to various digital equipment and mobile tools.

Since further increases in the number of environments in which the projectors will be used is anticipated, more advanced value-added projectors are being vigorously developed in light of the new environments in which projectors will be used.

One type of optical element used for the projector is a polarization-converting element for converting luminous flux emitted from a light source into one kind of polarized light. Such a polarization-converting element is arranged close to the light-incident side of a lens array or the light-emerging side of the lens array, depending on the structure of an optical system. In either of these cases, the position thereof is properly adjusted relative to the lens array.

A luminous-flux dividing element is typically positioned on the front face of the light source (light-emerging side). Therefore, in the positional relationship between the polarization-converting element and the lens array, when the polarization-converting element is arranged in the light-incident side of the lens array, it is also necessary to adjust the positional relationship between the polarization-converting element and the luminous-flux dividing element which is further located in the light-incident side. In contrast, when the polarization-converting element is arranged in the light-emerging side of the lens array, the positional adjustment should be performed between the lens array and the luminous-flux dividing element.

SUMMARY OF THE INVENTION

However, since the positional adjustment between the polarization-converting element, the lens array, and the luminous-flux dividing element is individually performed on a supporting body that supports these elements, the adjustment operation takes time. Therefore, it has been attempted to integrally form and unitize the polarization-converting element and the lens array, and to simultaneously positionally adjust both of these elements with the unitization. In such a case, on the supporting body, only the positional adjustment between this unit and the luminous-flux dividing element may be performed, thereby simplifying the adjustment operation.

On the other hand, since the polarization-converting element and the lens array are liable to reach a high temperature by incidence and emergence of light, they need to be cooled by cooling air.

The polarization-converting element and the lens array must be cooled, however, it is difficult to efficiently cool the polarization-converting element and the lens array, both of which are unitized together.

It is therefore an object of the present invention to provide a polarization-converting unit capable of being sufficiently cooled, even when polarization-converting elements and a lens array are unitized together, and to provide a projector using the polarization-converting unit.

A polarization-converting unit according to the present invention includes: polarization-converting elements, a lens array arranged so as to oppose the polarization-converting elements and to define a clearance therebetween, and a holding frame that integrally holds the polarization-converting elements and the lens array together, the holding frame being provided with at least a pair of openings to allow cooling air to flow-in and flow-out of the clearance.

In such a structure, the holding frame is provided in order to unify the polarization-converting elements and the lens array together; the holding frame is provided with the openings to allow cooling air to flow-in and flow-out therethrough, so that cooling air can flow through the clearance between the polarization-converting elements and the lens array, thereby the polarization-converting elements and the lens array are sufficiently cooled from faces opposing each other, which achieves the object of the present invention.

In a polarization-converting unit according to the present invention, one of the openings of the holding frame may be preferably provided with a current guide that guides cooling air toward the clearance.

In such a structure, the current guide is provided in the flow-inlet-side opening for cooling air, so that a larger amount of cooling air can securely flow into the clearance within the polarization-converting unit, thereby enhancing the cooling efficiency of the polarization-converting elements and the lens array.

In a polarization-converting unit according to the present invention, the current guide may be preferably formed to have a smooth curved surface.

In such a structure, the flow of cooling air becomes smooth in the current guide, so that flow-in and flow-out of the cooling air are efficiently performed, thereby furthermore enhancing the cooling efficiency. Also, impulsive noises are difficult to be produced when cooling air collides against the current guide so as to reduce noises.

A projector according to the present invention includes: a light source and a polarization-converting unit as disclosed above, wherein luminous flux emitted from the light source is magnified and projected so as to form a projected image after being modulated.

In such a structure, a projector capable of excellently cooling polarization-converting elements and a lens array can be provided by using the polarization-converting unit described above.

A projector according to the present invention may preferably further include a sirocco fan that exhausts cooling air to cool the air-flow-inlet-side opening disposed in the holding frame of the polarization-converting unit.

In such a structure, as cooling air is fed by the sirocco fan, reduction in noises is promoted compared to when an axial-flow fan is used, for example.

A projector according to the present invention may preferably further include a duct disposed between the sirocco fan and the cooling-air-flow-inlet-side opening.

In such a structure, by arranging the duct, all the cooling air exhausted from the sirocco fan can be fed to the opening of the polarization-converting unit, thereby also enhancing the cooling efficiency.

In a projector according to the present invention, a portion of the duct may be preferably formed of an outer case.

In a projector according to the present invention, a portion of the duct may be preferably formed of a supporting body that holds the polarization-converting unit.

In these structures, the duct does not need to be separate and distinct from the outer case and the supporting body, thereby enabling the number of parts and the cost to be reduced.

In a projector according to the present invention, the sirocco fan may be preferably arranged in the supporting body.

In such a structure, because the sirocco fan and the supporting body can be unified together in advance before assembling them in the outer case, etc., the assembling operation is easier than that in which these parts are individually assembled in the outer case, which enhances the efficiency during the assembling.

In a projector according to the present invention, the duct may preferably communicate with the front face (light-emerging side) of the light-source.

In such a structure, cooling air can also be fed toward the optical elements, such as the luminous-flux dividing element arranged between the light source and the polarization-converting unit, so that most of the optical elements arranged close to the light source can be cooled.

A projector according to the present invention may further include: a filter that shields ultraviolet radiation (UV filter), and a luminous-flux dividing element, both of which are arranged on the front face of the light source. In such a structure, the UV filter and the luminous flux dividing element, both of which are optical elements placed close to the light source, are sufficiently cooled.

In a projector according to the present invention, the bottom surface of an outer case may be preferably provided with a concave portion at a position corresponding to that of the sirocco fan.

In such a structure, the sirocco fan is arranged so as to sink into the concave portion on the bottom face, so that the top face level of the sirocco fan can be lowered, enabling the thickness of the entire projector to be reduced.

In a projector according to the present invention, the sirocco fan may be preferably arranged in the light-emerging side of the polarization-converting unit.

In such a structure, the sirocco fan is arranged in the side opposite to the light source relative to the polarization-converting device, so as to increase flexibility for positioning the sirocco fan and eliminate the parts around the light source, thereby securely providing the opening for replacing a lamp, etc.

DETAILED DESCRIPTION OF PREFERRED EMBODIMENTS

An embodiment according to the present invention will be described below with reference to the drawings.

1. Principal Structure of Projector

Figure 1:
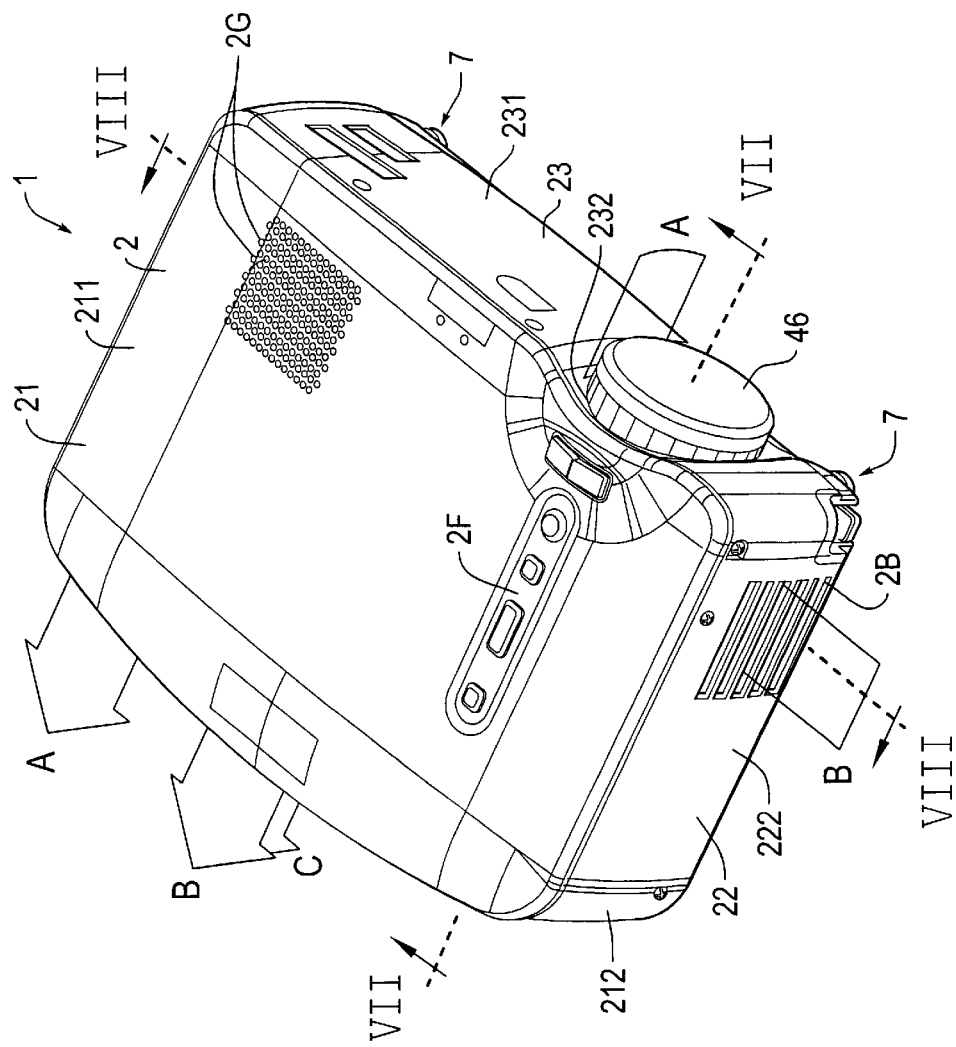
FIG. 1 is a perspective view of the entire projector according to an embodiment of the present invention as viewed from above the projector.
Figure 2:
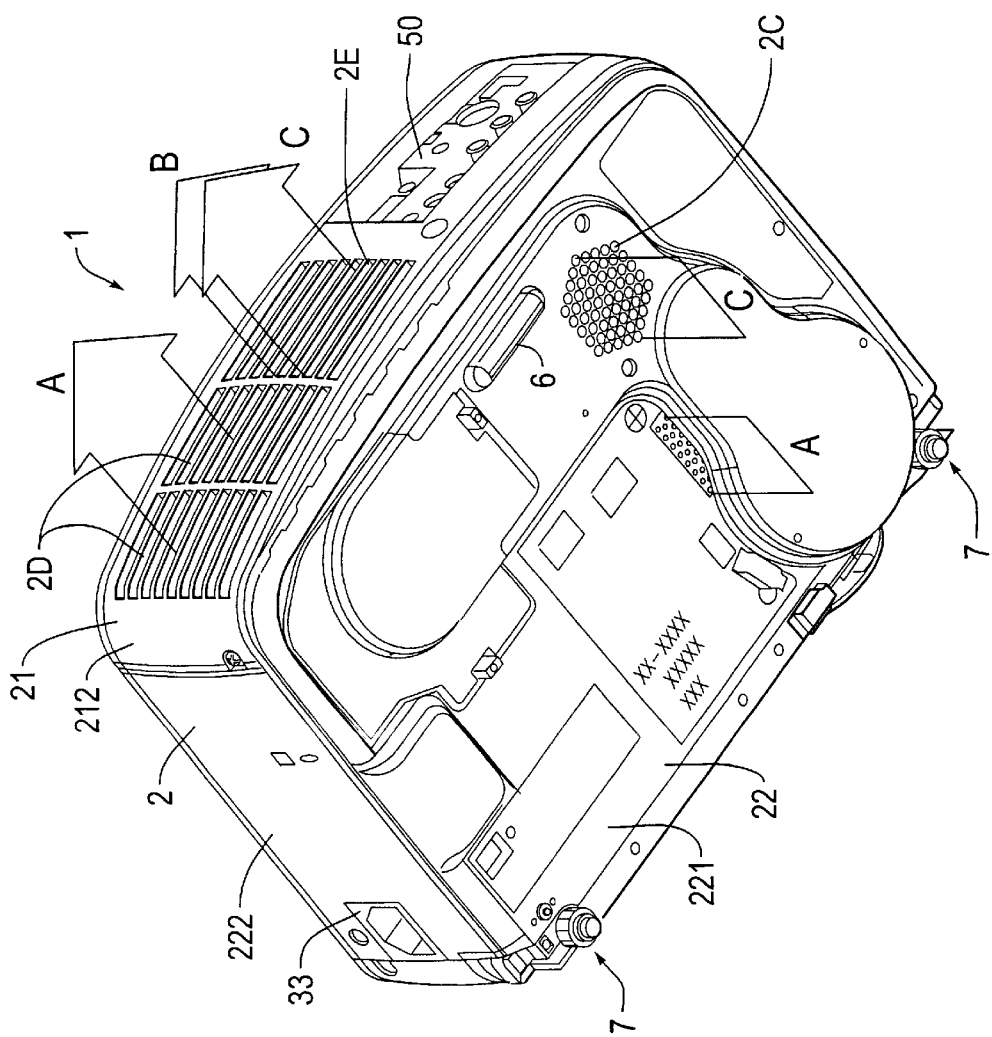
FIG. 2 is a perspective view of the entire projector as viewed from below the projector.

FIG. 1 is a perspective view of the entire projector 1 according to an embodiment of the present invention as viewed from above the projector; FIG. 2 is a perspective view of the entire projector 1 as viewed from below the projector; and FIG. 3 is a perspective view of the projector 1 showing the inside thereof.

Figure 3:
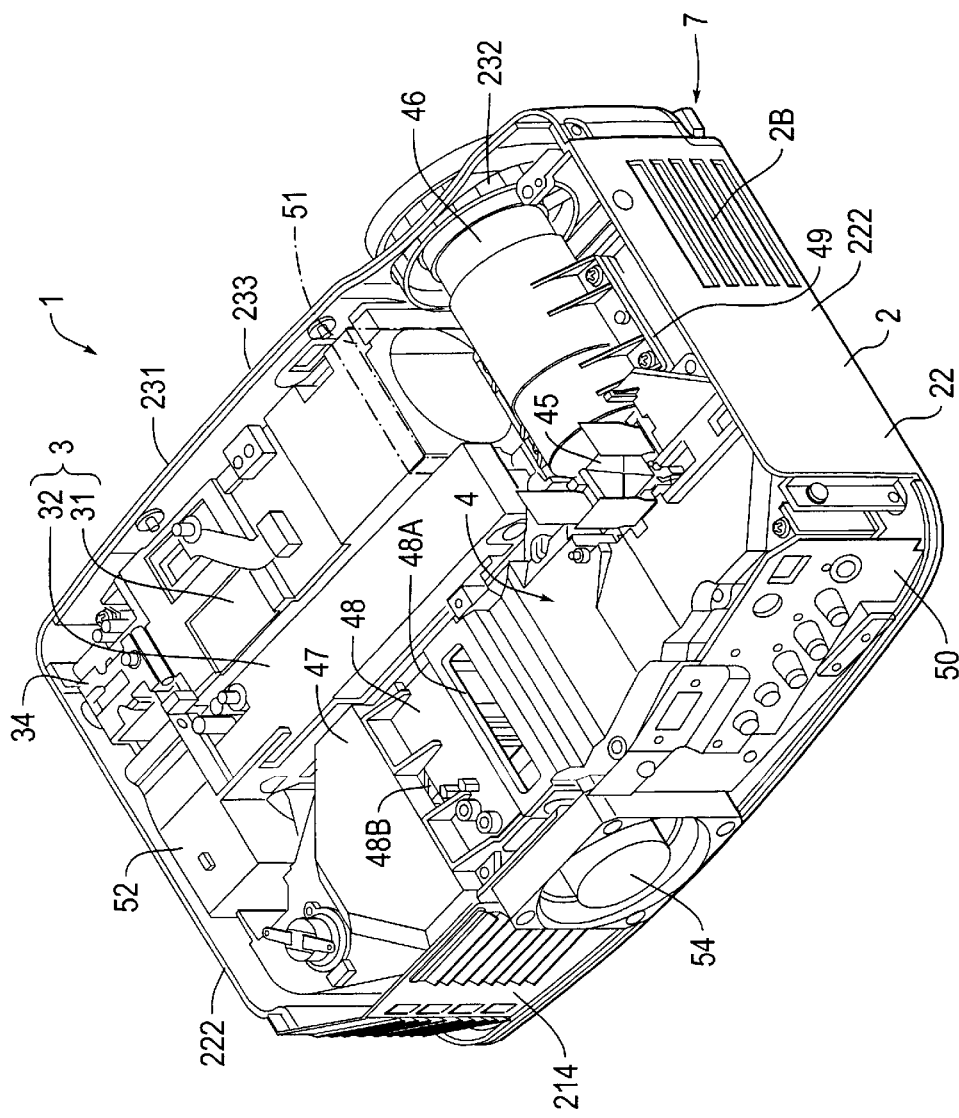
FIG. 3 is a perspective view of the projector showing the inside thereof.

In FIGS. 1 to 3, the projector 1 includes: a substantially cubic-box-like outer case 2, a power-supply unit 3 accommodated within the outer case 2, and an optical unit 4 having an L-shaped plane and also being accommodated within the outer case 2.

Figure 4:
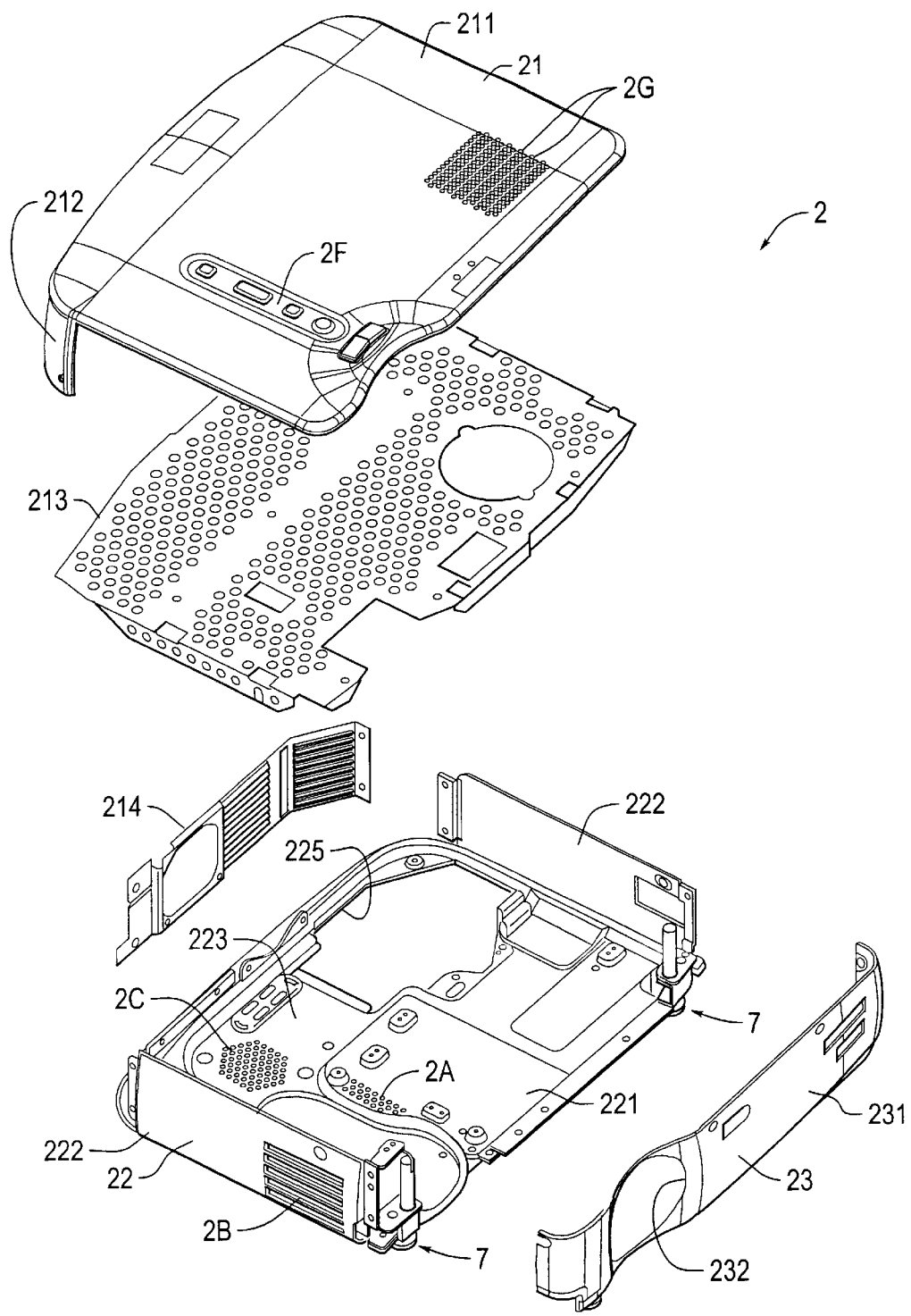
FIG. 4 is an exploded perspective view of an outer case according to the embodiment of the invention.

As is shown in FIG. 4, the outer case 2 includes: an upper case 21 made from a synthetic resin, a lower case 22 made from a metal such as aluminum, and a front case 23 also made from a metal such as aluminum, which are fixed to each other with screws.

The upper case 21 is integrally formed of a top face 211 and a back face 212.

Inside the top face 211, a porous first electromagnetic-shielding member 213 made by punching an aluminum plate is detachably arranged. Inside the back face 212 of the upper case 21, a second electromagnetic-shielding member 214 made from an aluminum plate is also arranged. The second electromagnetic-shielding member 214 is connected to the lower case 22 with screws.

The lower case 22 is integrally formed of a bottom face 221 and a pair of side faces 222 opposing each other. The bottom face 221 and the side faces 222 are bent to each other by bending an aluminum plate, etc., formed by a press, a machining center, and so forth to have a predetermined shape.

Both front corners of the bottom face 221 are provided with height-adjustment mechanisms 7 that adjust the inclination of the entire projector 1 so as to align the projected image position. On the other hand, in the center on the rear side of the bottom face 221, a foot member 6 (FIG. 2) made from a resin is solely fitted therein. On the back face of the bottom face 221, an opening 225 for replacing a lamp (FIG. 4) is formed.

The front case 23 forms a front face 231 of the outer case 2, and is also made by bending or drawing an aluminum plate, etc., formed by a press, a machining center, and so forth to have a predetermined shape. The front case 23 is provided with a circular opening 232 formed therein corresponding to a projection lens 46. The periphery of the circular opening 232 is curved inwardly by drawing.

In the outer case 2, there are provided air-inlets 2A, 2B, and 2C that inwardly receive cooling air, air-outlets 2D and 2E that exhaust cooling air from the inside, an operating panel 2F (FIGS. 1 and 7), and further a number of holes 2G formed corresponding to the position of a speaker. On the rear face of the outer case 2, various connectors for interfacing are exposed. A driver board on which the connectors are mounted and other boards are supported by an aluminum plate 50 fixed so as to plug an opening portion of the rear face. The aluminum plate 50 also serves as an electromagnetic shielding board.

The power-supply unit 3 includes: a main power-supply 31 arranged in the front face side within the outer case 2 (FIG. 3) and a ballast 32 arranged in the rear of the main power-supply 31. The main power-supply 31 supplies electric power received through a power cable to the ballast 32 and a driver board (electronic circuit board, not shown), etc., and includes an inlet connector 33 (FIG. 2) into which the power cable is inserted, an aluminum frame 34 surrounding the periphery, and a power circuit (not shown).

The ballast 32 mainly supplies electric power to a light-source lamp (which is described later) of the optical unit 4 and includes a lamp driving circuit.

Figure 5:
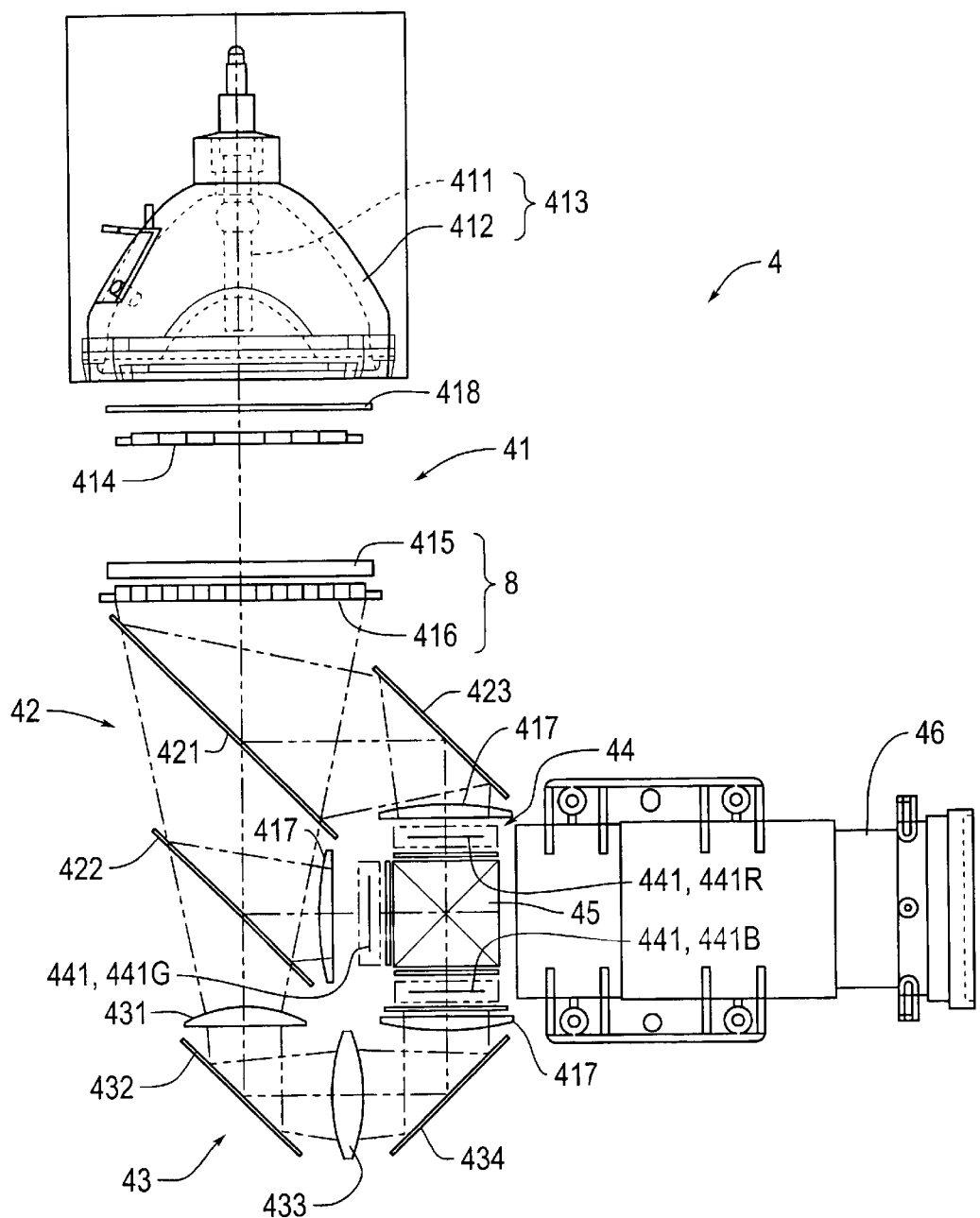
FIG. 5 is a plan view schematically showing each optical system of the projector.

As is shown in FIG. 5, the optical unit 4 includes an integrator-illumination optical system 41, a color-separation optical system 42, a relay optical system 43, an electro-optical system 44, a cross-dichroic prism 45 as a color-composition optical system, and a projection lens 46 as a projection optical system.

2. Detail Structure of Optical System

In FIG. 5, the integrator-illumination optical system 41 includes a light-source device 413 including a light-source lamp 411 and a reflector 412, a first lens array 414 as a luminous-flux dividing element, a polarization-converting element 415, and a second lens array 416. Luminous flux emitted from the light-source lamp 411 is reflected by the reflector 412 so as to focus at a focal point; then, it is divided into plural parts of luminous flux by the first lens array 414 arranged on the way to the focal point so as to be converted into one kind of polarized light by the polarization-converting element 415; and then it enters into the second lens array 416. Such a polarization-converting element 415 is disclosed in Japanese Unexamined Patent Application Publication No. 8-304739, for example.

Each part of luminous flux converted into the one kind of polarized light by the polarization-converting element 415 focuses on a condenser lens 417, and ultimately, it is substantially superimposed on liquid crystal panels 441 (liquid crystal panels 441R, 441G, and 441B, for each color) as three optical modulators (light valves) forming the electro-optical system 44.

The color-separation optical system 42 includes two dichroic mirrors 421 and 422 and a reflecting mirror 423, and has a function of dividing plural parts of luminous flux emitted from the integrator-illumination optical system 41 into three light colors red, green, and blue by the mirrors 421 and 422.

The relay optical system 43 includes an incident-side lens 431, a relay lens 433, and reflecting mirrors 432 and 434, and has a function of introducing each light color separated by the color-separation optical system 42 to the liquid crystal panel. For example, blue light color is introduced to the liquid crystal panel 441B.

The electro-optical system 44 includes liquid crystal panels 441R, 441 G, and 441 B as three optical modulators. These panels are formed by using a poly-silicon TFT as a switching element, for example. Each light color separated by the color-separation optical system 42 is modulated by each of the three liquid crystal panels 441R, 441G, and 441B according to image information so as to form an optical image.

The cross-dichroic prism 45 forms images which are emitted from the three liquid crystal panels 441R, 441Q and 441B and modulated every each color so as to form a color image. In addition, in the cross-dichroic prism 45, a dielectric multi-layer film that reflects a red light beam and a dielectric multi-layer film that reflects a blue light beam are formed along the four surfaces of the right-angle prism to have a substantially X-shape. Three light colors are formed by these dielectric multi-layer films. The color image formed in the cross-dichroic prism 45 is emitted from the projection lens 46 so as to be magnified and projected on a screen.

Figure 6:
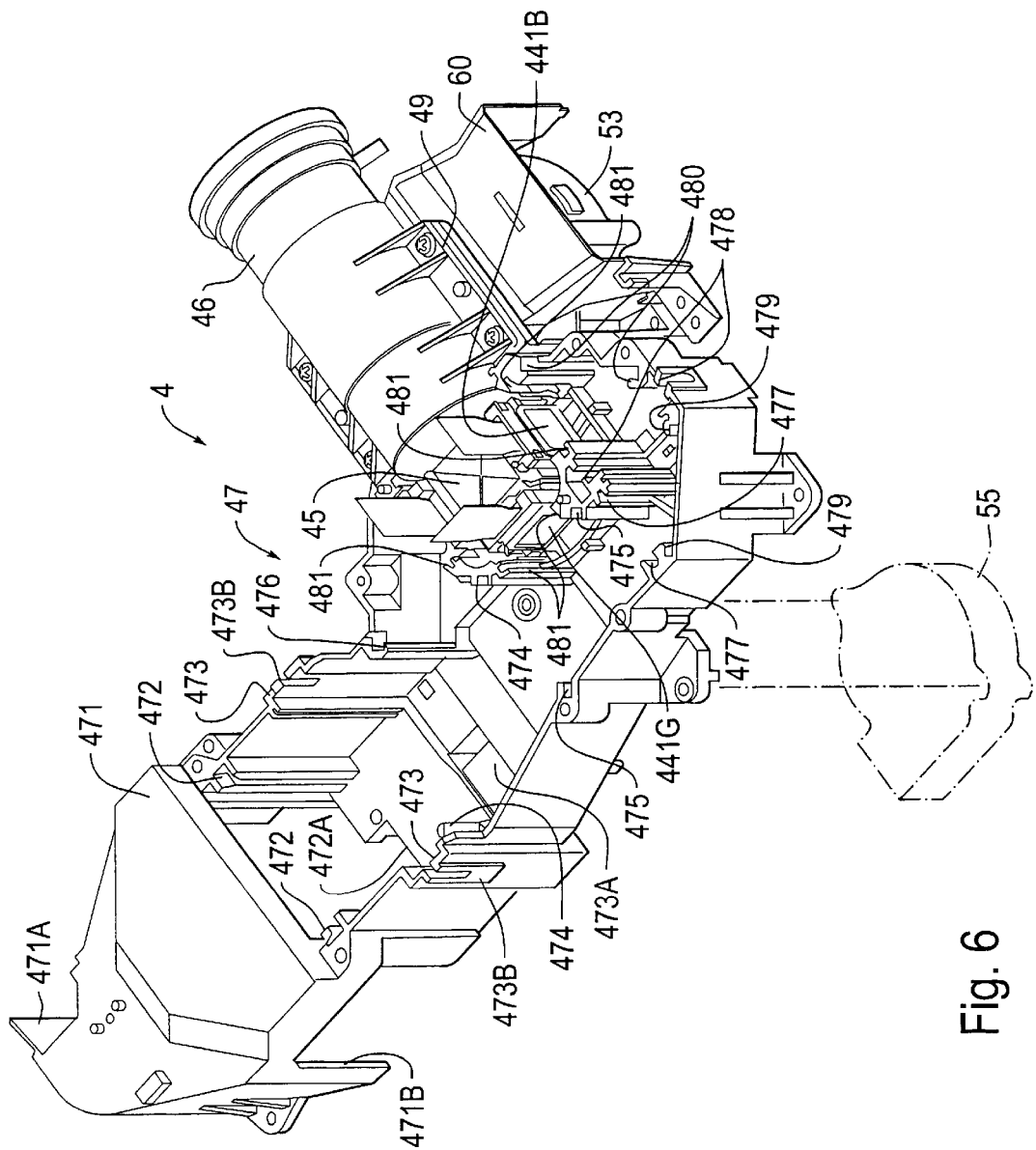
FIG. 6 is a perspective view of an optical unit of the projector showing structural members thereof.
Figure 11:
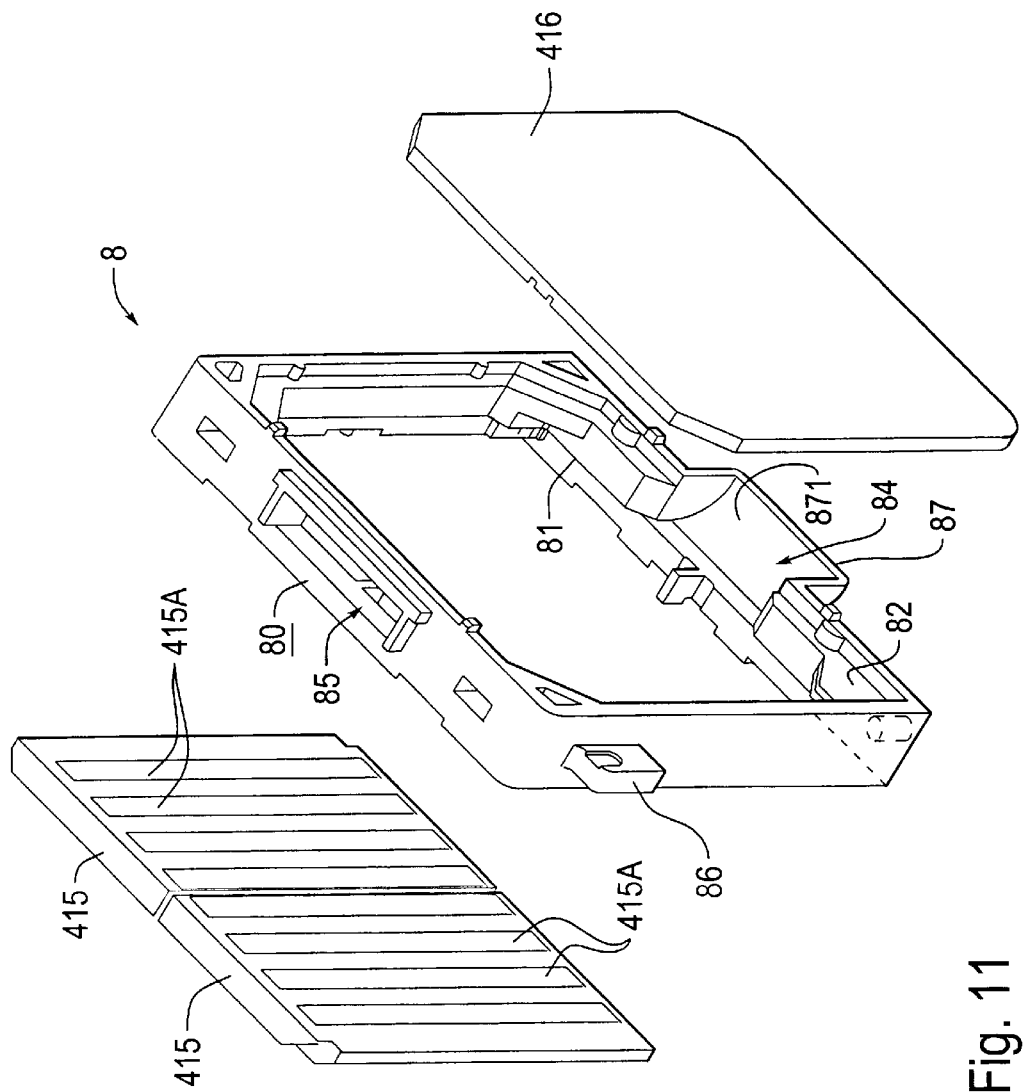
FIG. 11 is an exploded perspective view of the polarization-converting unit.

The optical systems 41 to 45 described above are accommodated within a inner case 47 made from a synthetic resin and shown in FIG. 6. That is, the inner case 47 is provided with grooves 472 to 481 into which the above-mentioned optical parts 414 to 416, 421 to 423, 431 to 434 are slidingly fitted from the upper part, as well as a light-source protector 471 that covers the light-source device 413. The polarization-converting elements 415 and the second lens array 416 are fitted into the groove 473, both of which are integrated into one piece, namely, the polarization-converting unit 8 (FIG. 11). Then, a cover 48 shown in FIG. 3 is attached to the inner case 47.

The inner case 47 is also provided with an aluminum head plate 49 (FIGS. 6 and 7) formed in the light-emerging side thereof. At one end of the head plate 49, the cross-dichroic prism 45 having the liquid crystal panels 441R, 441Q and 441B integrally attached thereto is fixed, and the projection lens 46 is fixed on a flange along a semi-cylindrical portion at the other end.

3. Cooling Structure

In FIGS. 1 to 3, within the projector 1, there are provided a first cooling system A in which the cooling air received from the side of the projection lens 46 and an air-inlet 2A formed on the bottom of the outer case 2 is exhausted from an air-outlet 2D, a second cooling system B in which the cooling air received from an air-inlet 2B formed on the side of the outer case 2 is exhausted from an air-outlet 2E, and a third cooling system C in which the cooling air received from an air-inlet 2C formed on the bottom of the outer case 2 is exhausted from the air-outlet 2E.

In the first cooling system A, an axial-flow in-take fan 51 (shown by the alternate long and short dash lines in FIG. 3) is arranged in the side of the main power-supply 31 toward the projection lens 46 while a first sirocco fan 52 is arranged in the ballast 32 toward the light-source device 413.

By driving the axial-flow in-take fan 51, the cooling air received from the side of the projection lens 46 and from the air-inlet 2A is further received by the first sirocco fan 52 after cooling the main power-supply 31. By the in-take action of the first sirocco fan 52, part of the cooling air from the air-inlet 2A flows toward the sirocco fan 52 so as to be received therein while cooling the ballast 32. The cooling air exhausted from the first sirocco fan 52 enters inside the light-source protector 471 from a cut-out for in-take 471A formed in the inner case 47 so as to cool the light-source device 413 from the rear; then, it is exhausted from a cut-out for exhaust 471B (FIG. 6) so as to be finally exhausted outside the outer case 2 from the outlet 2D.

Figure 7:
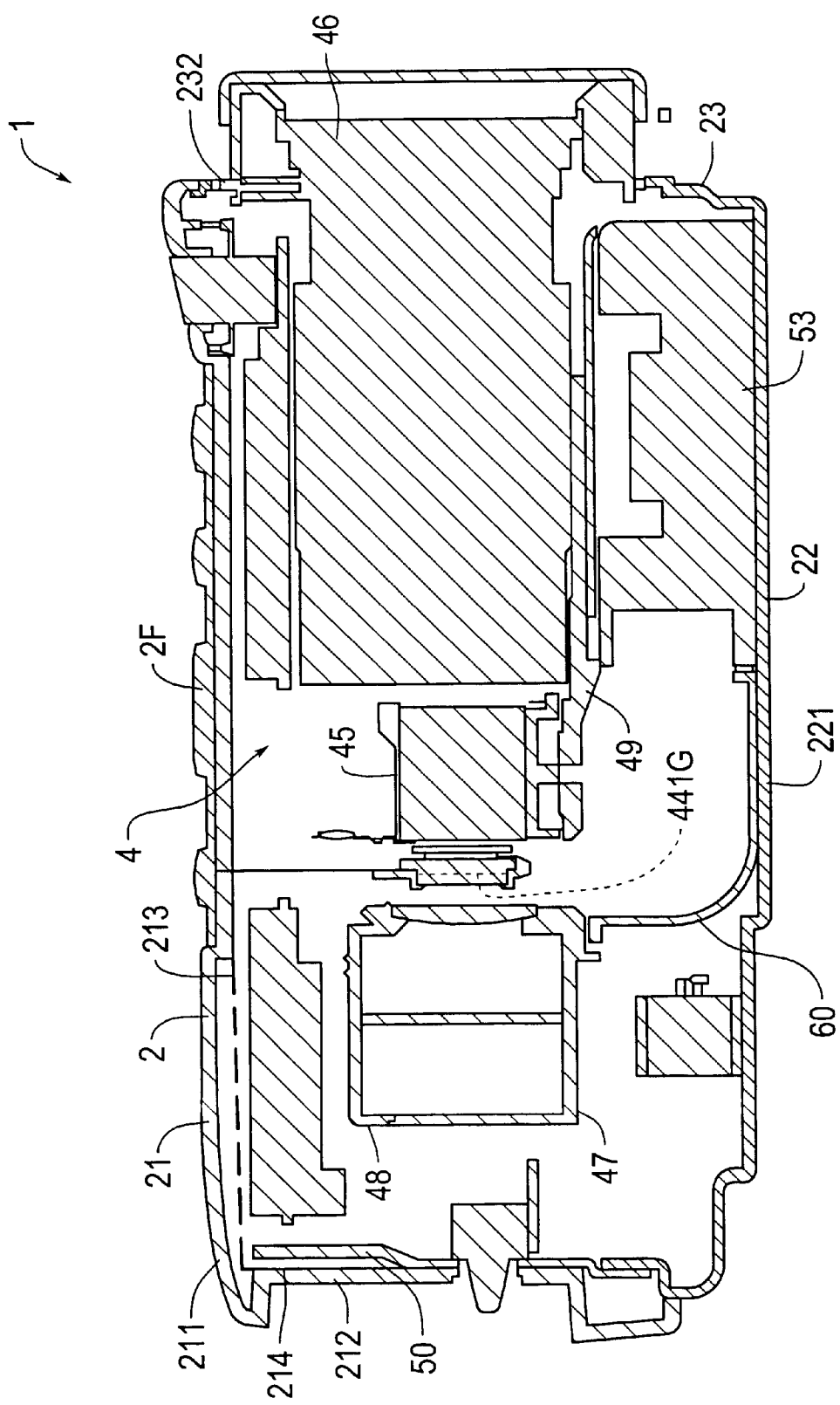
FIG. 7 is a longitudinal sectional view viewed in the direction of the arrows VII—VII in FIG. 1.
Figure 8:
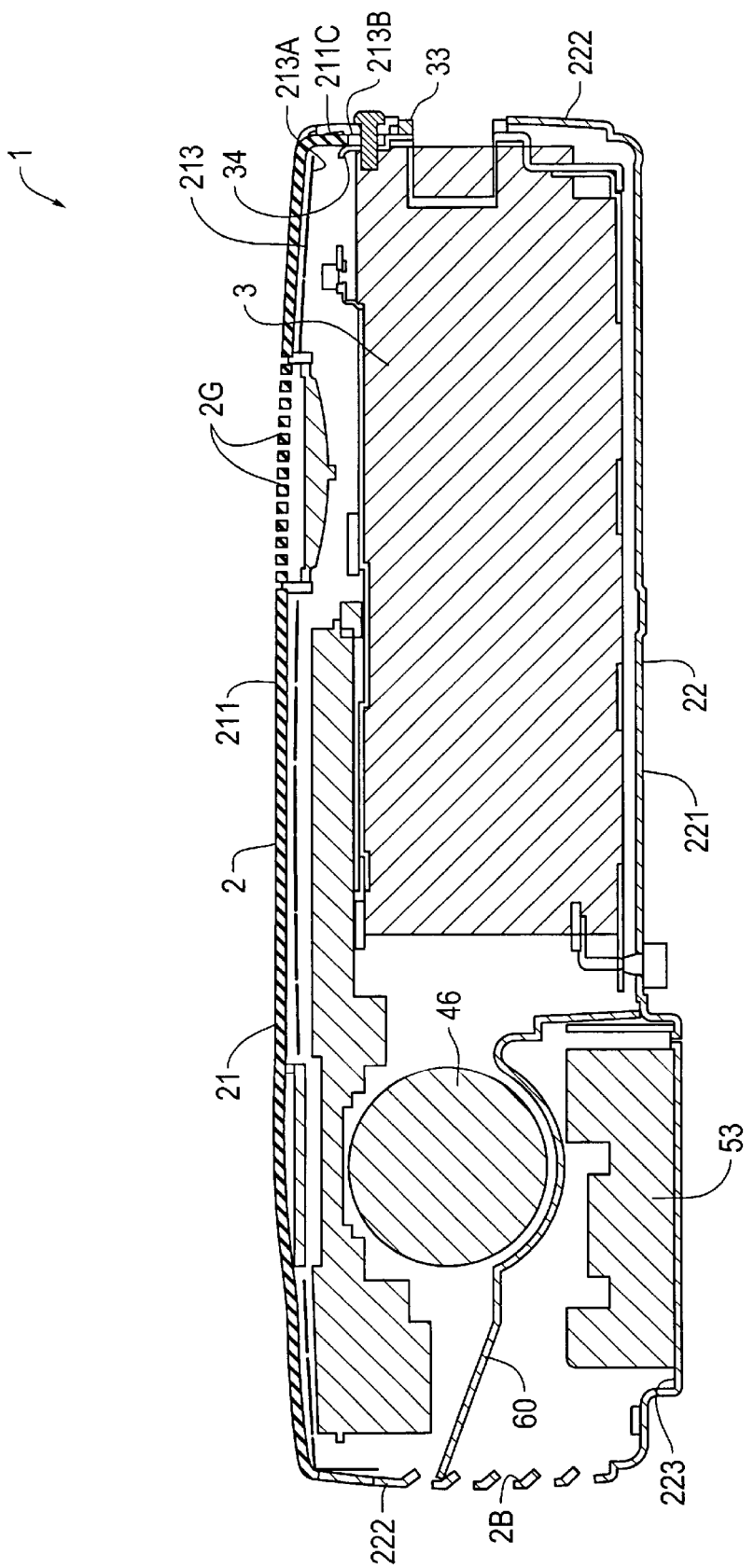
FIG. 8 is a longitudinal sectional view viewed in the direction of the arrows VIII—VIII in FIG. 1.

In the second cooling system B, as is shown in the sectional views of FIGS. 7 and 8, a second sirocco fan 53 is arranged underneath the projection lens 46. The second sirocco fan 53 is placed in the intermediate portion within a duct member 60 (FIG. 6) that introduces cooling air from the air-inlet 2B toward the lower part of the electro-optical system 44.

The air received from the air-inlet 2B is introduced into the duct member 60 so as to be received by the second sirocco fan 53; then, it cools the electro-optical system 44 after being exhausted along the bottom surface of the outer case 2. Subsequently, the cooling air proceeds toward an axial-flow exhaust fan 54 in the backside while cooling the driver board (not shown) arranged above the optical unit 4, and then, it is exhausted by the exhaust fan 54 from the air-outlet 2E.

In the third cooling system C, as shown by the alternate long and short dash lines in FIG. 6, a third sirocco fan 55 is arranged at the position on the bottom surface of inner case 47 corresponding to that of the air-inlet 2C on the bottom face of the outer case 2. Reducing the diameter of each of holes of the air-inlet 2C as small as possible makes it difficult for the air-inlet 2C to draw in dust on the set-up place of the projector 1.

The cooling air received into the third sirocco fan 55 from the air-inlet 2C passes through between the bottom surface of outer case 2 and the lower surface of the inner case 47 so as to be exhausted toward the light-source device 413; then, it is introduced into openings for in-take 472A and 473A (FIG. 6) which are respectively formed corresponding to the grooves 472 and 473 of the inner case 47; then, it cools a UV filter 418 as well as the above-mentioned unit arranged in the grooves 472 and 473 and including the first lens array 414, the polarization-converting elements 415, and the second lens array 416 from a lower part toward an upper part. Then, the cooling air is exhausted from openings for exhaust 48A and 48B (FIG. 3) of the cover 48; and it is finally exhausted from the air-outlet 2E by the axial-flow exhaust fan 54 in the backside.

In addition, the third cooling system C will be described in detail below.

4. Detailed Structure of Third Cooling System

Figure 9:
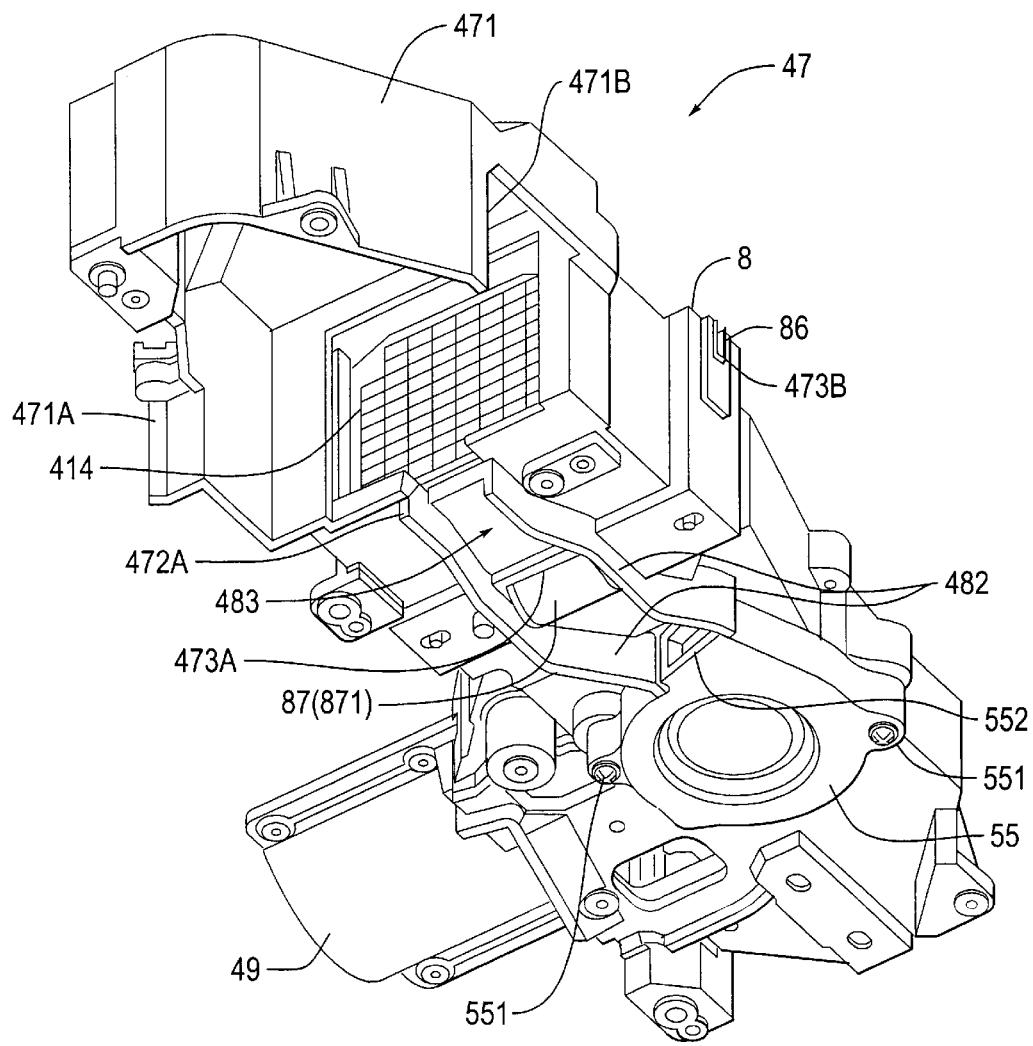
FIG. 9 is a perspective view of a supporting body according to the embodiment of the invention viewed from the bottom face.

In FIG. 9, the third sirocco fan 55 is fixed on the bottom surface of the inner case 47 as a supporting body with screws 551. The fixing position is located toward the light-emergence closer than a polarization-converting unit 8 and opposite to the light-source device 413 (FIG. 6), so that it does not have to compete for arrangement space with the light-source device 413. Also, the third sirocco fan 55 sinks into a concave portion 223 formed to be sunken on the bottom face 221 of the lower case 22 so that the top face level of the third sirocco fan 55 is lowered.

On the bottom surface of the inner case 47, a fin-like duct-forming section 482 is integrally formed extending from an air-outlet 552 of the third sirocco fan 55 to the opening for in-take 473A, and further extending toward the opening for in-take 472A on the front face of the light-source device 413. The lower end of the duct-forming section 482 is closed by pasting a sheet 484 (FIG. 13) made from a resin thereto so as to form a cylindrical duct 483 by parts surrounded by the duct-forming section 482, the sheet 484, and the bottom surface of the inner case 47.

Figure 10:
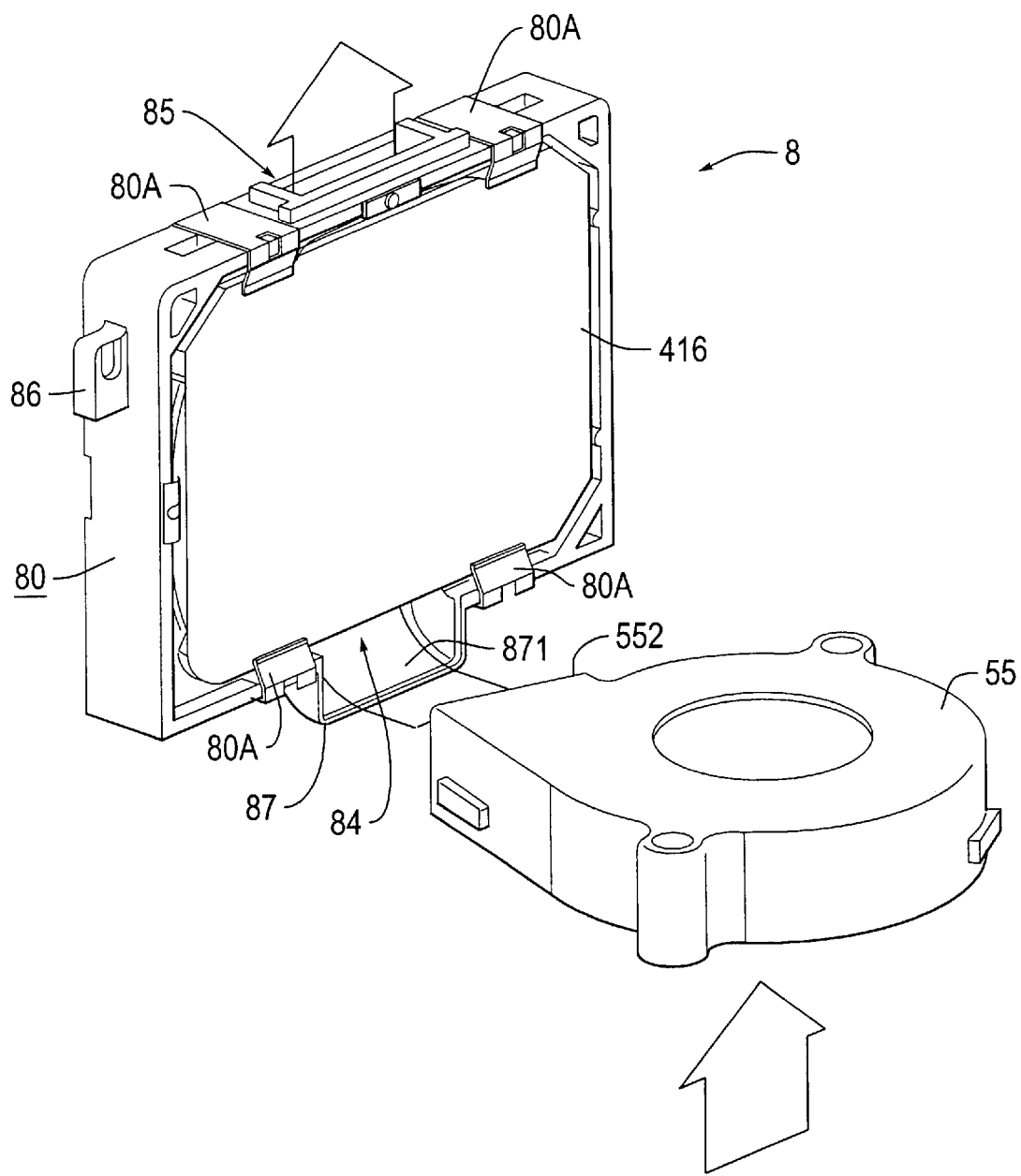
FIG. 10 is a perspective view showing the positional relationship between a polarization-converting unit and a sirocco fan according to the embodiment of the invention.
Figure 12:
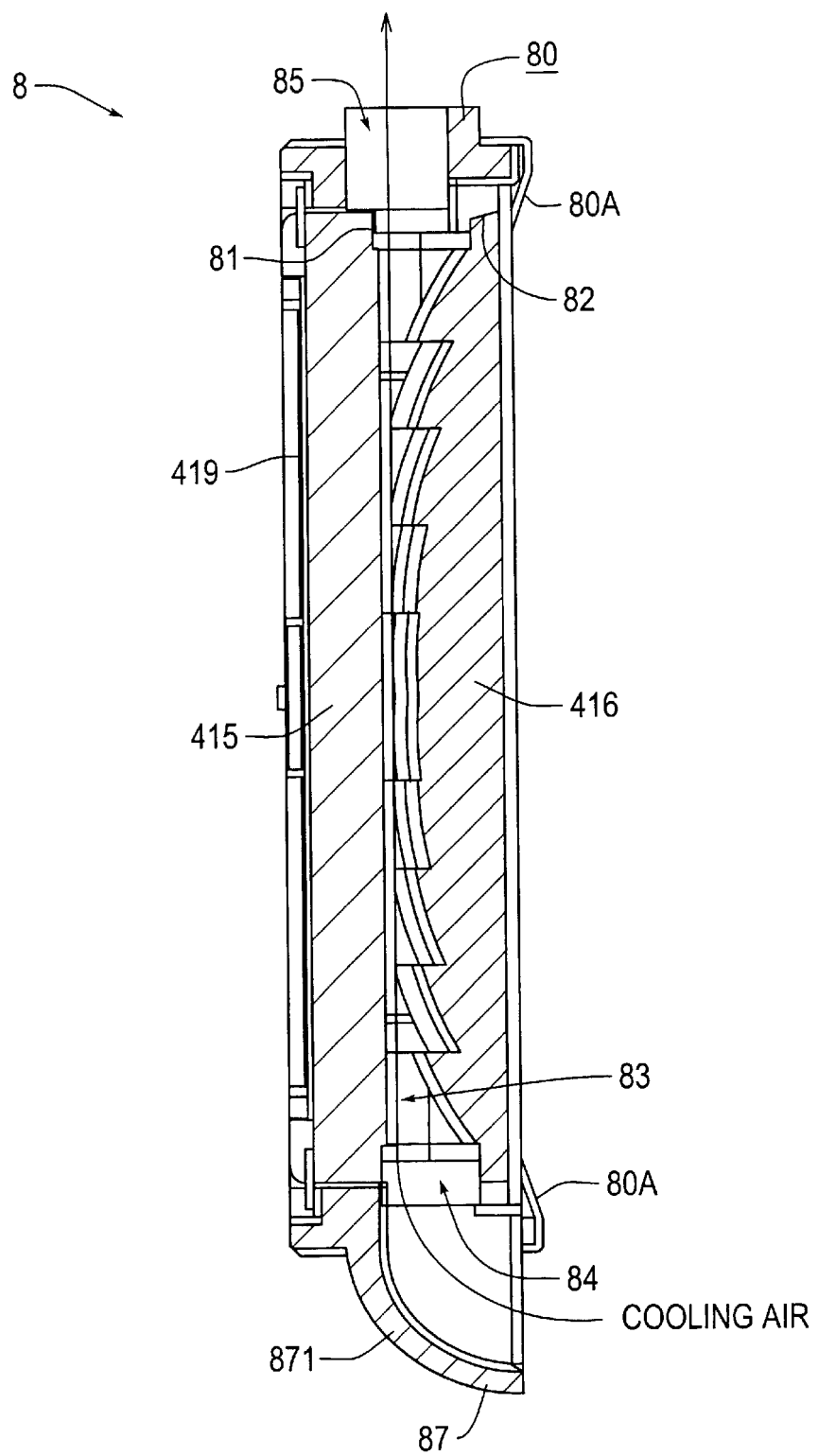
FIG. 12 is a longitudinal sectional view of the polarization-converting unit.

In FIGS. 10 to 12, the polarization-converting unit 8 to be cooled includes the above-mentioned polarization-converting elements 415 and the second lens array 416, and a holding frame 80 made from a resin that integrally holds both of these parts; and a metallic douser 419 (FIG. 12) having plural slits is disposed in the light-incident side of the polarization-converting elements 415. On the faces of the polarization-converting elements 415 opposing the second lens array 416, phase-difference plates 415A (FIG. 11) are pasted by corresponding to positions of polarization-separating films (inside, not shown) and reflecting films. In addition, in the polarization-converting elements 415 according to the embodiment, a pair of them are bilaterally arranged so that the light-reflecting directions inside are opposite to each other.

The holding frame 80 includes: a light-incident side fitting portion 81 to which the polarization-converting elements 415 are attached, and a light-emerging side fitting portion 82 to which the second lens array 416 is attached. The polarization-converting elements 415 and the second lens array 416 are attached to the respective fitting portions 81 and 82 and are fixed thereto with plural clips 80A, so that a clearance 83 (FIG. 12) is created on a face of the polarization-converting elements 415 opposing the second lens array 416, while three-dimensional positioning between both of them is completed.

In a lower part of the holding frame 80, a flow-inlet-side opening 84 is provided, and the clearance 83 within the polarization-converting unit 8 is communicated with the outside in the lower side. A flow-outlet-side opening 85 is provided in an upper part thereof, and the clearance 83 is communicated with the outside in the upper side.

Figure 13:
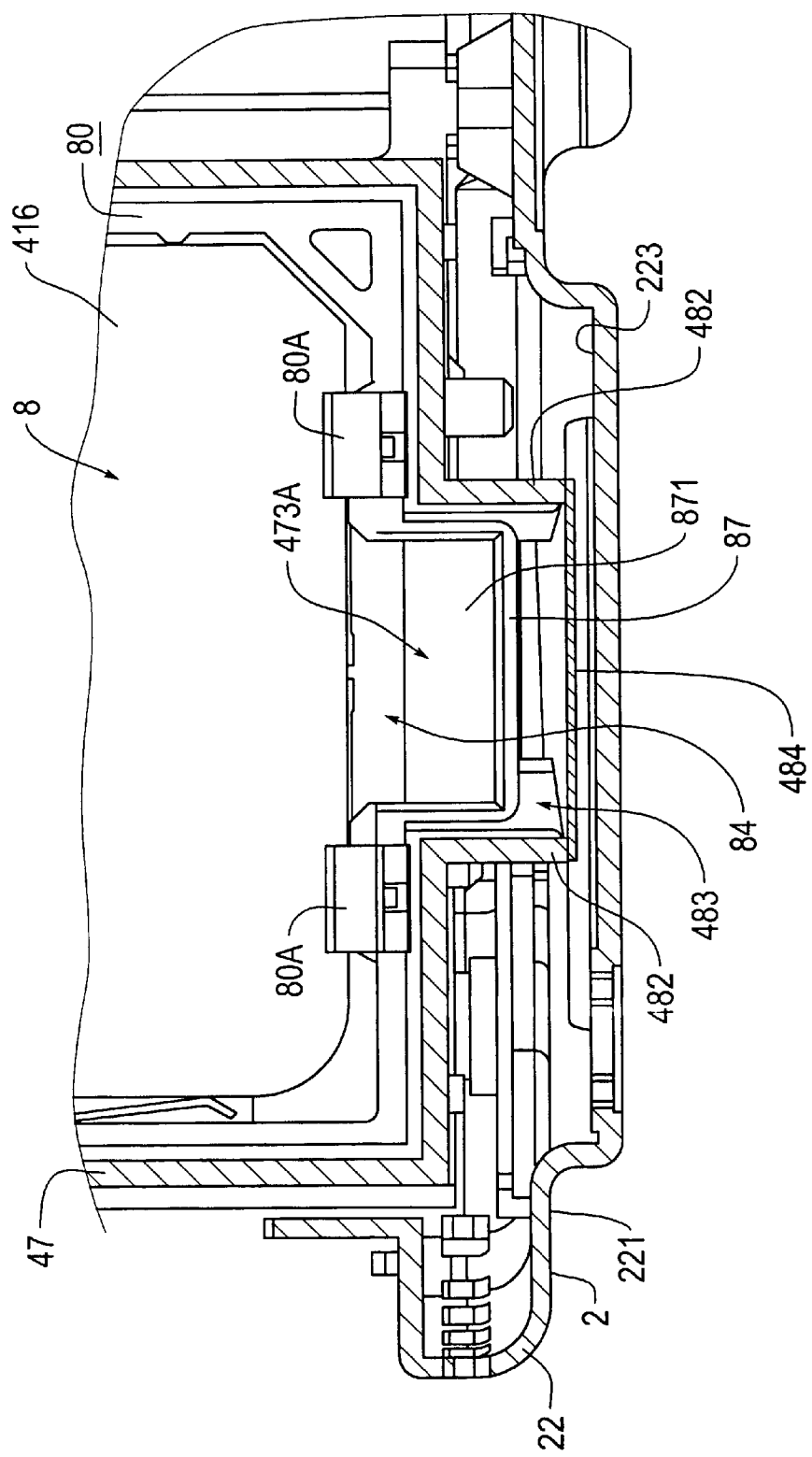
FIG. 13 is a longitudinal sectional view of an essential part of the projector.

The flow-inlet-side opening 84 is provided with a current guide 87 opened toward the third sirocco fan 55. As is shown in FIG. 13, the current guide 87 protrudes inside the duct 483 from the opening for in-take 473A when the polarization-converting unit 8 is placed in the inner case 47, and introduces the cooling air exhausted from the third sirocco fan 55 toward the clearance 83 within the polarization-converting unit 8. A guide plate 871 of the current guide 87 has a smooth curved shape so as to guide the cooling air smoothly.

The flow-outlet-side opening 85 corresponds to the opening for exhaust 48A (FIG. 3) of the cover 48 to be attached to the inner case 47 and can exhaust cooling air outside the inner case 47.

Such a polarization-converting unit 8 has retainers 86 on both faces of the holding frame 80. These retainers 86 are brought into engagement with parts to be engaged with 473B (FIG. 6) of the inner case 47 so as to be positioned and fixed with adhesive in the engaged state. Such positioning operation is performed by properly operating a positioning device (jig, not shown) after holding the polarization-converting unit 8 by hooking a claw for chucking provided in the positioning device to the flow-outlet-side opening 85 of the polarization-converting unit 8.

The cooling air exhausted from the third sirocco fan 55 flows into the clearance 83 of the polarization-converting unit 8 from the flow-inlet-side opening 84 via the duct 483;

then it is exhausted from the flow-outlet-side opening 85 after cooling surfaces of the polarization-converting elements 415 opposing the second lens array.

5. Effect of the Embodiment

According to such an embodiment, there are provided the following effects.

(1) In the third cooling system C of the projector 1, the polarization-converting elements 415 and the second lens array 416 are held by the holding frame 80 so as to form the polarization-converting unit 8 which is to be cooled; the flow-inlet-side opening 84 is arranged under the holding frame 80 and the flow-outlet-side opening 85 is arranged over the holding frame 80, so that the cooling air exhausted from the third sirocco fan 55 can be allowed to vertically flow through the clearance 83 between the polarization-converting elements 415 and the second lens array 416, thereby sufficiently cooling the polarization-converting elements 415 and the second lens array 416 from the faces thereof opposing each other. Therefore, in the structure according to the embodiment in which the clearance 83 is extremely small especially due to the phase-difference plates 415A pasted to the opposing faces of the polarization-converting elements 415, the thermal effect to the phase-difference plates 415A can be securely reduced by the cooling air flowing through within the clearance 83, and thereby the phase-difference plates 415A are prevented from being peeled off so as to maintain sufficient image quality.

(2) The flow-inlet-side opening 84 of the holding frame 80 is provided with the current guide 87 for guiding cooling air to the clearance 83, so that a larger amount of cooling air is allowed to securely flow into the clearance 83 within the polarization-converting unit 8, thereby more efficiently cooling the polarization-converting elements 415 and the second lens array 416.

(3) Since the current guide 87 includes the guide plate 871 having a smooth curved surface, cooling air is allowed to flow in the current guide 87 smoothly, enabling the cooling efficiency to be enhanced by efficient flow-in and flow-out of the cooling air. It is difficult to produce impulsive noises when cooling air collides against the current guide, and thus it also provides the advantage of reducing noises.

(4) Since cooling air is fed to the flow-inlet-side opening 84 of the polarization-converting unit 8 by using the third sirocco fan 55, noises can be reduced more than those of an axial-flow fan, for example.

(5) Since the duct 483 is arranged between the third sirocco fan 55 and the flow-inlet-side opening 84 of the polarization-converting unit 8, all the cooling air exhausted from the third sirocco fan 55 can be fed to the flow-inlet-side opening 84, thereby also enhancing the cooling efficiency of the polarization-converting elements 415 and the second lens array 416.

(6) At this time, since the duct-forming section 482 forming part of the duct 483 is integrally formed with the inner case 47, the duct 483 does not need to be prepared as a part different from the outer case 2 and the inner case 47, thereby enabling the number of parts and the cost to be reduced.

(7) Also, the duct 483 extends to and communicates with the front face of the light-source device 413 which includes the light-source lamp 411, so that the UV filter 418 and the first lens array 414 as a luminous-flux dividing element, both of which are located immediately in front of the light-source lamp 411, can also be securely cooled.

(8) As the third sirocco fan 55 is fixed to the inner case 47 with screws, the inner case 47 can be assembled in the lower case 22 of the outer case 2 together with the third sirocco fan 55 by attaching the third sirocco fan 55 to the inner case 47 in advance. Therefore, the assembling to the comparatively large lower case 22 can be finished at one time by unitizing internal parts together in advance, which are comparatively easy to assemble, thereby the number of handling times of the large lower case 22 can be reduced so as to enhance efficiency during the assembling.

(9) The third sirocco fan 55 is arranged so as to sink into the concave portion 223 formed on the bottom face 221 of the lower case 22, so that the top face level of the third sirocco fan 55 can be lowered, enabling the thickness of the entire projector 1 to be reduced.

(10) The third sirocco fan 55 is arranged toward the light-emergence closer than the polarization-converting unit 8, so that the third sirocco fan 55 does not have to compete with the light-source device 413 for space, thereby securely providing the opening 225 for replacing a lamp on the bottom face 221 of the lower case 22.

6. Modifications

In addition, the present invention is not limited to the embodiment described above; however, it can contain other structures capable of achieving the object of the present invention, and the present invention includes modifications which will be described below.

For example, the current guide 87 disposed in the polarization-converting unit 8 according to the embodiment has the guide plate 871 having a curved shape. However, the guide plate 871 can be any shape. For example, it may be a vertical surface or a planar slope.

Also, the current guide 87 is not essential for the present invention. Even when the flow-inlet-side opening 84 is only provided, the present invention can be also applied thereto.

The flow-inlet-side opening 84 and the flow-outlet-side opening 85 disposed in the holding frame 80 of the polarization-converting unit 8 can be provided at any position as long as they correspond to those of the opening for in-take 473A of the inner case 47 and the opening for exhaust 48A of the cover 48, respectively, and they are not limited to the positions according to the embodiment.

The polarization-converting unit according to the present invention, may be a type of structure in which a lens array disposed in the light-incident side as a luminous-flux dividing element and polarization-converting elements disposed in the light-emerging side are integrally formed with the holding frame.

In the embodiment of the invention, the third sirocco fan 55 is arranged in the light-emerging side of the polarization-converting unit 8. However, such an arrangement position may be arbitrarily decided. It is preferable that it be arranged so as not to compete for space with other internal elements just like in the embodiment.

The concave portion 223 of the lower case 22, into which the third sirocco fan 55 sinks, may be arranged in view of the height and size of the third sirocco fan 55 and the height and size of the entire projector 1 for design, etc. When the concave portion 223 is omitted from that result, the present invention can also be applied thereto.

The third sirocco fan 55 may be fixed to the side of the lower case 22 as well as to the inner case 47.

The duct-forming section 482 forming the duct 483 is integrally formed with the inner case 47. However, it may also be integrally formed with the side of the lower case 22. Such a structure can be applied to the present invention discussed above. Also, the configuration of the duct-forming section 482 is not limited to the embodiment, and it may be decided in view of the positional relationship between the third sirocco fan 55 and the polarization-converting unit 8.

However, the duct 483 is not essential to the present invention, and it may be arranged on demand.

When an axial-flow exhaust fan is used instead of the third sirocco fan 55 used in the embodiment, the present invention can also be applied thereto. However, when the axial-flow fan is arranged on the bottom face 221 of the lower case 22, it is necessary to allow cooling air to flow along the bottom face 221 by changing the direction of the air, which complicates the duct structure and may prevent the projector from being miniaturized. Also, increase in noise level due to an axial-flow fan is a factor. Therefore, it is preferable that a sirocco fan be used just like in the embodiment of the invention.

In the embodiment described above, the projector having three optical modulators is only described as an example. However, the present invention can be applied to a projector using only one optical modulator, a projector using two optical modulators, or a projector using four optical modulators or more. In the embodiment of the invention, the liquid crystal panel is used as an optical modulator; an optical modulator except the liquid crystal panel, such as a device using a micro-mirror, may be used. Also, in the embodiment of the invention, the transmission-type optical modulator having a plane of light-incidence and a plane of light-emergence both of which are different from each other is used. However, a reflection-type optical modulator having a plane of light-incidence and a plane of light-emergence both of which are identical to each other may also be used. Furthermore, in the embodiment of the invention, the front-type projector in which projection is performed from the direction viewing a screen is only described as an example. The present invention can also be applied to a rear-type projector in which the projection is performed from the direction opposite to that viewing a screen.

As described above, according to the present invention, the holding frame is used in order to unify the polarization-converting elements and the lens array together. The holding frame is provided with the openings for allowing cooling air to flow-in and flow-out therethrough, so that cooling air can flow through the clearance between the polarization-converting elements and the lens array, thereby the advantage is provided that the polarization-converting elements and the lens array are sufficiently cooled from faces opposing each other.

What is claimed is:

1. A polarization-converting unit, comprising:
   polarization-converting elements;
   a lens array arranged so as to oppose the polarization-converting elements and defining a clearance therebetween; and
   a holding frame that integrally holds the polarization-converting elements and the lens array together, the holding frame being provided with openings to allow cooling air to flow-in and flow-out of the clearance.

2. The unit according to claim 1, the opening of the holding frame to allow cooling air to flow-in being provided with a current guide that guides cooling air toward the clearance.

3. The unit according to claim 2, the current guide being formed to have a smooth curved surface.

4. A projector, comprising:
   a light source; and
   a polarization-converting unit according to claim 1, luminous flux emitted from the light source being magnified and projected so as to form a projected image after being modulated.

5. The projector according to claim 4, further comprising a sirocco fan that exhausts cooling air to a cooling-air-flow-inlet-side opening disposed in the holding frame of the polarization-converting unit.

6. The projector according to claim 5, further comprising a duct disposed between the sirocco fan and the cooling air-flow-inlet-side opening.

7. The projector according to claim 6, further comprising an outer case, a portion of the duct being formed of the outer case.

8. The projector according to claim 6, further comprising a supporting body that holds the polarization-converting unit, a portion of the duct being formed of the supporting body.

9. The projector according to claim 8, the sirocco fan being arranged in the supporting body.

10. The projector according to claim 6, the duct communicating with a front face of the light-source.

11. The projector according to claim 10, further comprising:
    a filter that shields ultraviolet radiation; and
    a luminous-flux dividing element, the filter and the luminous-flux dividing element being arranged toward the front face of the light-source.

12. The projector according to claim 5, a bottom surface of an outer case being provided with a concave portion at a position corresponding to the sirocco fan.

13. The projector according to claim 5, the sirocco fan being arranged in a light-emerging side of the polarization-converting unit.

* * * * *